United States Patent
Alcorn et al.

(10) Patent No.: US 11,032,384 B2
(45) Date of Patent: Jun. 8, 2021

(54) SYSTEM AND METHOD FOR PROVIDING USAGE OF AND/OR ACCESS TO SECURED DATA VIA USING PUSH NOTIFICATION INFRASTRUCTURE

(71) Applicant: LENOVO Enterprise Solutions (Singapore) PTE. LTD., New Tech Park (SG)

(72) Inventors: Matthew R. Alcorn, Durham, NC (US); James G. McLean, Raleigh, NC (US); Randall W. Worzella, Raleigh, NC (US); Antonio Abbondanzio, Raleigh, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 16/693,131

(22) Filed: Nov. 22, 2019

(65) Prior Publication Data
US 2020/0092387 A1    Mar. 19, 2020

Related U.S. Application Data

(62) Division of application No. 15/691,225, filed on Aug. 30, 2017, now abandoned.

(51) Int. Cl.
| | | |
|---|---|---|
| G06F 15/16 | (2006.01) | |
| H04L 29/08 | (2006.01) | |
| H04L 29/06 | (2006.01) | |
| H04L 12/26 | (2006.01) | |
| H04L 12/24 | (2006.01) | |
| H04L 12/707 | (2013.01) | |

(52) U.S. Cl.
CPC ............ *H04L 67/26* (2013.01); *H04L 43/045* (2013.01); *H04L 43/0823* (2013.01); *H04L 63/0272* (2013.01); *H04L 63/0428* (2013.01); *H04L 63/0838* (2013.01); *H04L 41/0677* (2013.01); *H04L 45/22* (2013.01)

(58) Field of Classification Search
CPC ... H04L 67/26; H04L 43/045; H04L 63/0272; H04L 63/0428; H04L 63/0838; H04L 41/0677; H04L 45/22
USPC ........................................................ 709/217
See application file for complete search history.

(56) References Cited

U.S. PATENT DOCUMENTS

| | | | | |
|---|---|---|---|---|
| 10,552,823 | B1* | 2/2020 | Woodward | H04L 63/0846 |
| 2011/0088085 | A1* | 4/2011 | Novak | G06F 21/31 |
| | | | | 726/7 |
| 2015/0312248 | A1* | 10/2015 | Pruthi | H04L 63/0838 |
| | | | | 726/7 |
| 2018/0124195 | A1* | 5/2018 | Bell | H04L 12/1859 |

* cited by examiner

*Primary Examiner* — Wing F Chan
*Assistant Examiner* — Joseph R Maniwang
(74) *Attorney, Agent, or Firm* — Kunzler Bean & Adamson; Bruce R. Needham

(57) ABSTRACT

A method that includes providing a push notification from a system management appliance (SMA) to a user device. The push notification includes a one-time password for access to the SMA on a temporary alternate route to a normal route between the SMA and the user device to permit the user device to obtain additional information pertaining to the push notification.

19 Claims, 8 Drawing Sheets

SYSTEM AND METHOD FOR PROVIDING USAGE OF AND/OR ACCESS TO SECURED DATA VIA USING PUSH NOTIFICATION INFRASTRUCTURE

CROSS-REFERENCE TO RELATED APPLICATIONS

This is a divisional application of and claims priority to U.S. patent application Ser. No. 15/691,225 entitled "SYSTEM AND METHOD FOR PROVIDING USAGE OF AND/OR ACCESS TO SECURED DATA VIA USING PUSH NOTIFICATION INFRASTRUCTURE" and filed on Aug. 30, 2017, for Matthew R. Alcorn, which is incorporated herein by reference.

TECHNICAL FIELD

The present disclosure relates to providing usage of and/or access to secured data from a system management appliance (SMA) and, more particularly, to a system and method of providing usage of and/or access to secured data via a push notification mechanism.

BACKGROUND

Mobile applications have been used as solutions for system management. One advantage of such mobile applications is that alerts or other information from managed systems can be sent from System Management software to a mobile application in the form of a push notification.

Push notifications, though, are limited in size (e.g., 2 KB) and format, and are generally used as a summary of important information regarding an event, with the capability to launch an associated application to obtain detailed information regarding the event. However, in the case of a system management application or similar application, directly connecting to a target management server hosting the SMA, which is a high-security environment, may be difficult (where several additional security-related steps must be taken) or impossible (where a connection to the lab network or other high-security environment is not allowed or available).

For example, the current response of a user of a mobile device is to select the push notification to launch an application in the mobile device. In this arrangement, the application is effectively started up as if the user had selected it directly from the management system. This may require several prerequisite steps such as the establishment of a VPN, entering or re-confirming credentials, or other steps required to get to the high-security environment.

If this is not desirable or possible, the user must make do with information regarding the event provided in the push notification itself, which may be incomplete due to size and scope limitations of the push notification. For example, a system administrator may determine that access to an SMA needs to be shut down because of a security concern. Also, restrictions may be placed on access to information from the SMA when the user is outside of a certain geographical area, for example, when the user is in a foreign country. Also, different levels of access are often provided to users, and, in some instances, a user might not normally be permitted access to information related to an event identified in a push notification because the user does not have the required security clearance to access the information directly from the SMA.

As an example, consider an alert condition that is created on a server in a managed-hardware environment. The push notification itself provides an alert that a problem has occurred, but cannot convey detailed information (such as graphical image or detailed event logs). In normal operation, the application has stored credentials for accessing the target elements from the SMA on a target management server. When a notification is received, the application can route to the target management server via a secured path to obtain more information using the same credentialing method that it would use when simply connecting to the SMA in the target management server in a standard user-initiated way. Generally, this is not a problem if the mobile device is on the same network or can access the SMA via a Virtual Private Network (VPN). However, in certain instances, such as noted above, this secured path is not available or requires too many extra steps for the user to easily obtain detailed information directly from the SMA in the target management server.

BRIEF SUMMARY

In an aspect of the disclosure, a method includes providing an alert to a user device via a push notification system management appliance (SMA). The push notification includes encoded data to permit the user device to reconstruct information pertaining to the alert.

In another aspect of the disclosure, a method includes providing a push notification from a system management appliance (SMA) to a user device. The push notification includes a one-time password for access to the SMA on a temporary alternate route to a normal route between the SMA and the user device to permit the user device to obtain additional information pertaining to the push notification.

In another aspect of the disclosure, a system includes a system management appliance (SMA) configured to provide a push notification regarding an alert to a user device. The push notification includes encoded data to permit the user device to reconstruct information pertaining to the alert without having to communicate with the SMA after receiving the push notification.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
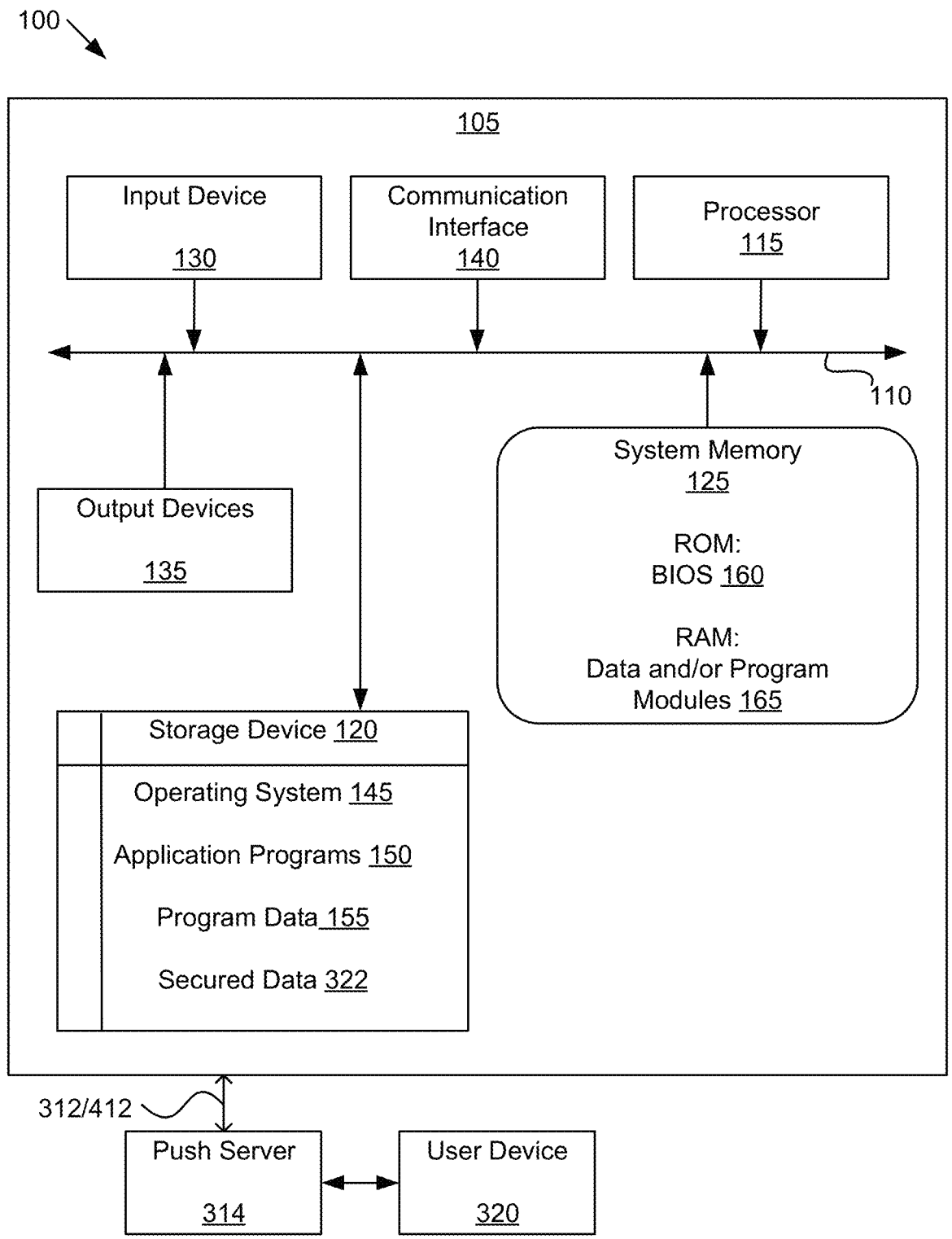
FIG. 1 is an illustrative architecture of a computing system in accordance with aspects of the present disclosure.

The present disclosure relates to using secured data for visually reconstructing images related to the secured data provided by a system management appliance (SMA) at a user device. More particularly, the present disclosure relates to providing an alert via a push notification to a user device, which push notification includes encoded data to permit the user device to reconstruct a information pertaining to the alert. This information can include at least one of a graphical image, or other visual representation such as a graphical overlay, a schematic illustration, a table of conditions and an error list.

Among other advantages, the present disclosure permits advising a user device of an event, and providing information to permit reconstruction of information pertaining to the event, without the need for a VPN or other complicated network structure. Further, the present disclosure allows the communication of data to a user device which is easier to observe visually, without the need for a high cost network arrangement for sending images to the user device pertaining to an event. For example, encoded data to permit the construction of a simplified image can be provided with the push notification itself, without the need for sending images to the user device separate from the push notification. Still further, the present disclosure permits a very quick visual construction of a pertinent graphical image, graphical overlay, schematic illustration, table of conditions, error list, etc. without the need for additional network calls, which would require much more time.

The present disclosure also relates to providing access to secured data from a system management appliance (SMA) and, more particularly, to a system and method of providing access to secured data via a push notification mechanism. More particularly, the present disclosure relates to providing a user device with a push notification which includes a one-time password for access to the SMA on a temporary alternate route, to permit the user device to obtain additional information pertaining to the push notification.

In embodiments, a push notification which advises a user device of an event also includes encoded data, such as JavaScript Object Notification (JSON) data, Extensible Markup Language (.xml) data, Comma-separated values (CSV) data, simple tab-delimited text or a custom encoded data format. The encoded data permits a receiving application in a user device to decipher/reconstruct the encoded data in a graphical manner, for example. More particularly, the encoded data permits the construction of a graphical image, or other visual representation, which is related to the event. In embodiments, the push notification includes information so that the user can either construct a graphical image (or other visual representation) or access and derive secured data with fewer security restrictions or intermediate steps than would be necessary if the user attempts to access the secured data from the SMA via normal communication routes between the SMA and the user device. Because any access to the SMA is temporary in nature, and only pertains to the details related to the specific event noted in the push notification, allowing access in this temporary manner is much less risky than a full-rights login to the management program In embodiments, in addition to advising a user device of an event, the push notification includes a one-time password for providing temporary access to secured data which is stored by a system management appliance (SMA) via a temporary alternate route to a normal route between the SMA and the user device. This alternative will permit the user device to obtain additional secured information pertaining to the push notification. In this way, the present disclosure provides the ability to obtain details on an event when access via normal communication channels to the network containing the management server is restricted. For example, the systems and methods described herein allow a mobile device to avoid normal firewalls around an SMA in order to obtain information without creating substantial security risks for the SMA. The systems and methods also provide the ability to: (i) obtain details of the event without going through access and authorization steps, (ii) provide details on a specific event without requiring or allowing access to the full system management software, (iii) forward details to another user without giving them authorization to access the full system management software, and (iv) make detailed information only temporarily available to a user device.

In embodiments, the push notification includes information so that the user can either construct a graphical image (or other visual representation) or access and derive secured data with fewer security restrictions or intermediate steps than would be necessary if the user attempts to access the secured data from the SMA via normal communication routes between the SMA and the user device. Because any access to the SMA is temporary in nature, and only pertains to the details related to the specific event noted in the push notification, allowing access in this temporary manner is much less risky than a full-rights login to the management program.

As described herein, implementations may be a system, a method, and/or a computer program product. The steps, methods and/or functionality disclosed herein can be implemented in any combination of hardware circuitry and software. The computer program product may include a computer readable storage medium (or media) having computer readable program instructions thereon for causing a processor to carry out aspects described herein. The computer readable storage medium (or media) includes, for example, non-transitory media such as flash memory, permanent memory such as read-only memory ("ROM"), semi-permanent memory such as random access memory ("RAM"), any other suitable type of storage component, or any combination thereof. Accordingly, the computer read able storage medium, as used herein, is not to be construed as being a transitory signal per se.

FIG. 1 is an illustrative architecture of a computing system 100 in accordance with aspects described herein for implementing the SMA. The computing system 100 is only one example of a suitable computing system and is not intended to suggest any limitation as to the scope of use or functionality of aspects described herein. The computing system 100 serves as a target management server for hosting an SMA, and includes a computing device 105. The computing device 105 can be resident on a network infrastructure such as within a cloud environment (shown in FIG. 2), or may be a separate independent computing device (e.g., a computing device of a third party service provider).

As described herein, the computing device 105 may perform tasks (e.g., processes, steps, methods and/or functionality) in response to processor 115 executing program instructions contained in a computer readable storage medium, such as system memory 125. The program instructions may be read into system memory 125 from another computer readable storage medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the results of such tasks in accordance with aspects described herein.

The computing device 105 may include a bus 110, a processor 115, a storage device 120, a system memory (hardware device) 125, one or more input devices 130, one or more output devices 135, and a communication interface 140. In embodiments, the computing device 105 can be a secure server, e.g., management server hosting the SMA. The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations described herein, which may be operatively implemented by the computer readable program instructions.

For example, the processor 115 may execute one or more applications and/or program modules that provide a user with a push notification, advising the user of an event. The push notification can include encoded data to permit the user device to reconstruct a graphical image, or other visual representation, which indicates information pertaining to the event. Alternately, the push notification can include a one-time password to permit access to secure information stored in an SMA via a temporary alternate route between the SMA and the user device. In one example, an event causes the push notification to be delivered to a user device with appropriate details to permit the construction of a graphical image or other visual representation related to an event indicated in the push notification. In another example, the event causes the push notification to be delivered to a user device with a one-time password to permit the user device to obtain more detailed secured information regarding the event from the SMA via a temporary alternate route. In any case, this allows a mobile device 320 to avoid normal firewalls around an SMA, thus to obtain information without creating substantial security risks for the SMA. This also provides the ability to: (i) obtain details of the event without going through access and authorization steps, (ii) provide details on a specific event without requiring or allowing access to the full system management software, and (iii) forward details to another user without giving them authorization to access the full system management software.

More specifically, in embodiments, the encoded data pertaining to secured information can be sent to a user device 320 at the same time in which a push notification is sent to the user device (mobile device) 320 via, e.g., a push server 314. In embodiments, the push notification includes encoded information pertaining to secured data 322 which has been stored in the computing device 105 of the target management server 100 which hosts the SMA. The secured data 322 is related to the event, and reconstructing a graphical image or other visual representation in the user device based upon the encoded data provided with the push notification does not require the user device to provide credentials which would normally be necessary to obtain the secured data 322 directly from the SMA, itself.

In embodiments, the encoded data for permitting construction of a graphical image or other visual representation can be provided in encrypted form. For example, the encoded data can be JavaScript Object Notification (JSON) data, or some other type of encoded data such as Extensible Markup Language (.xml) data, Comma-separated values (CSV) data, simple tab-delimited text and a custom encoded data format. The encoded data permits a receiving application in a user device to decipher/reconstruct the encoded data in a graphical manner or other visual representation. In addition, the encoded data may be protected with an additional set of credentials, different than the credentials which would be required to access the secured data directly from the SMA. Further, the encoded data may also include detailed log information, or other information related to the event in the push notification, in addition to the information required for constructing a graphical image pertaining to the event noted in the push notification. In an illustrative example, a server is managed by a system management software program such as Lenovo XClarity Administrator (LXCA). The management of the information can be done within the secure datacenter network environment, while the system administrator ("user") is without direct access to the datacenter network.

In operation, a user can access the encoded data directly from the push notification via a web browser (of the mobile device 320). In alternative embodiments, the push notification can trigger an application (either the primary mobile application for the systems management or an independent, purpose-specific application) which decodes and permits construction of the graphical image. In this way, the user can obtain details on the event in full rich-web format without having to provide full credentials to access the primary system management software. Accordingly, by implementing the systems and methods described herein, the computing system 100 may be configured to operate as a target management server to host a System Management Appliance (SMA) (see FIG. 3) to provide a user device with a push notification 312.

Also, the computing device 105 can provide notifications regarding errors which occur within the managed network. For example, when an error occurs on the server, an alert is logged on the systems management software. The details related to the particular failure on the particular server are formatted (including appropriate graphicals, detailed logs, etc.) and are sent to the user device as encoded data to permit construction of a graphical image pertaining to the error, as described herein.

Figure 4:
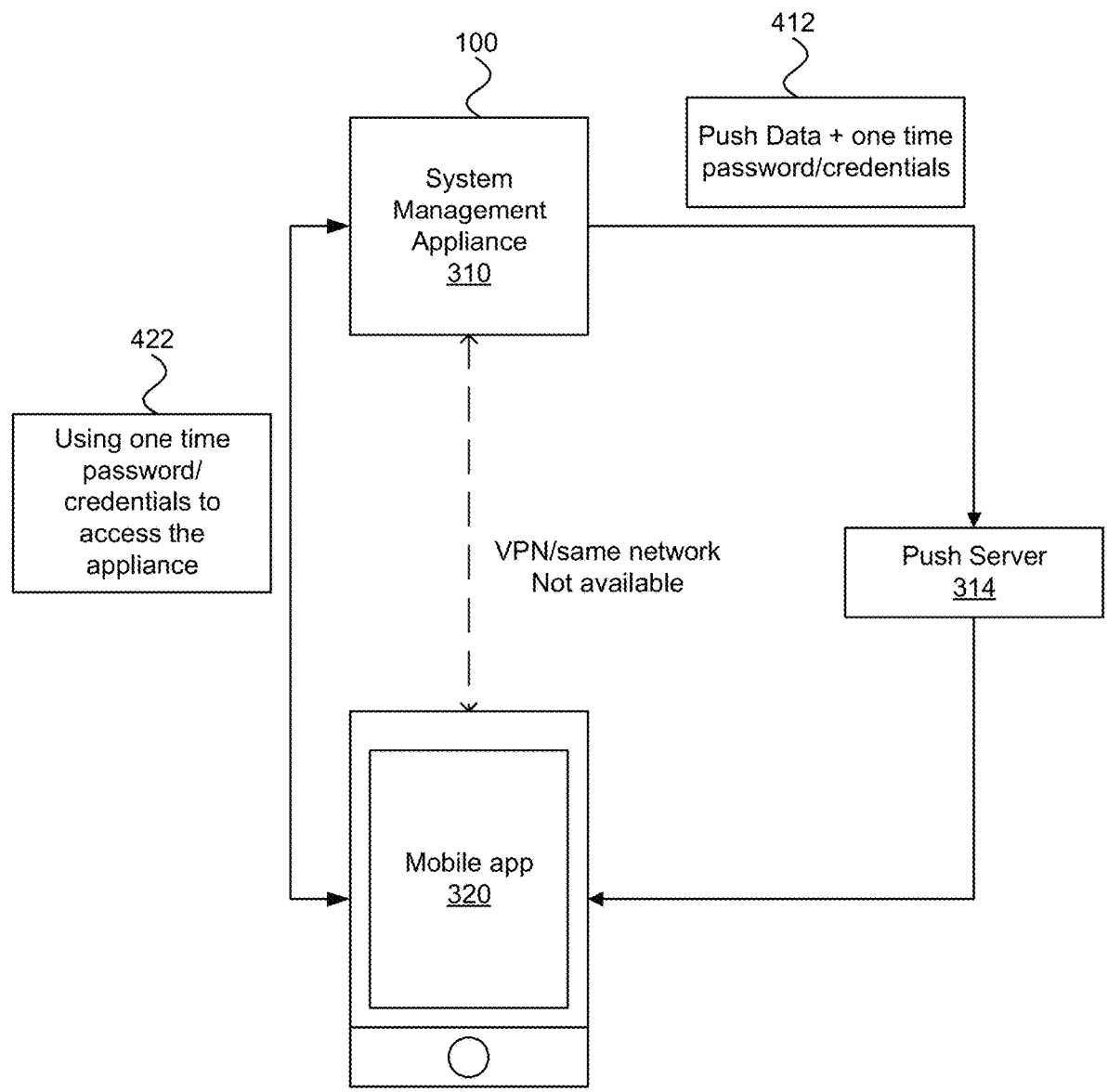
FIG. 4 shows a structure for providing access to secured data in an SMA on a temporary alternate route to a normal route between the SMA and a user device in accordance with aspects of the present disclosure.
Figure 5:
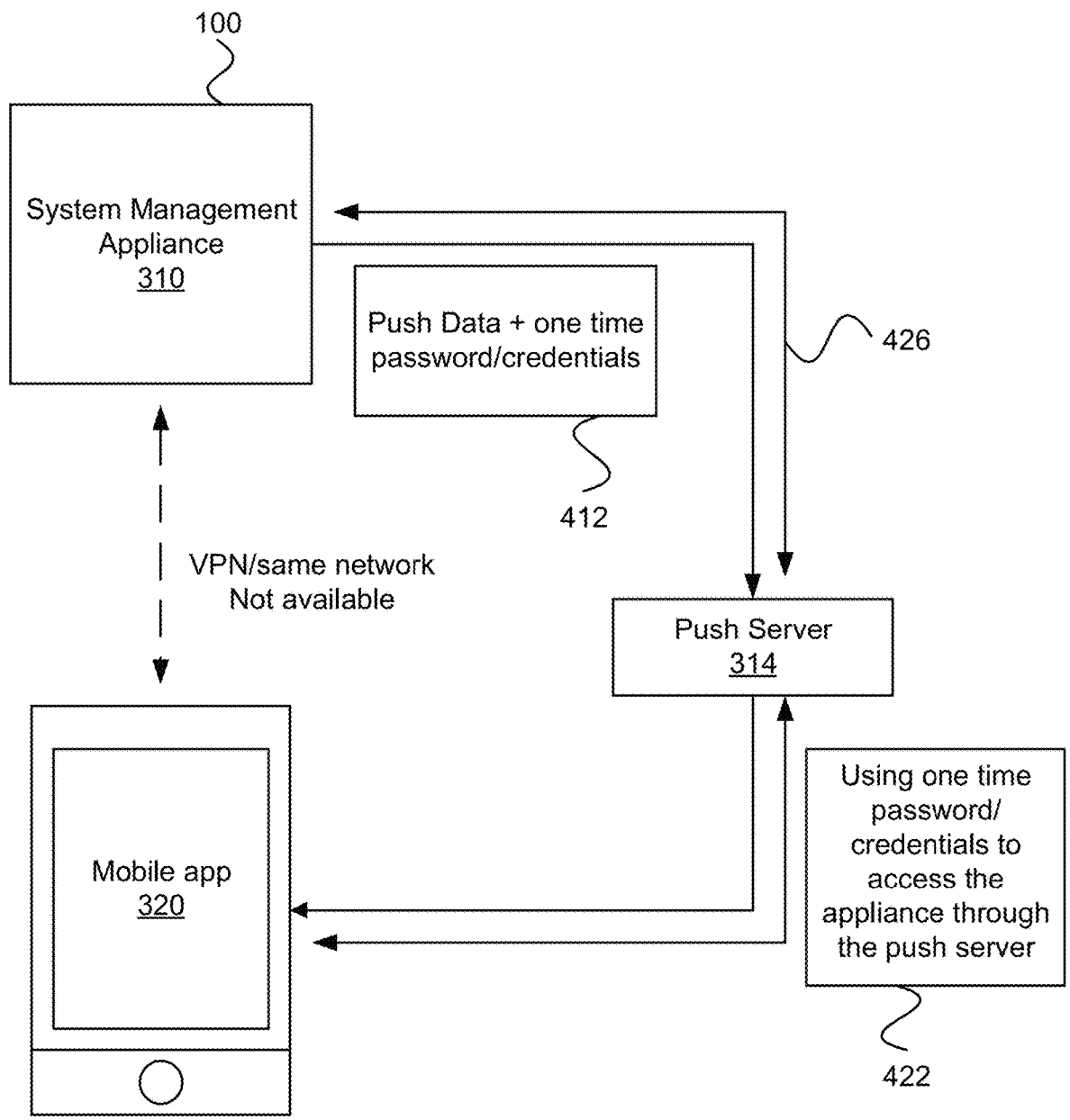
FIG. 5 shows a structure for providing access to a user device to secured data in an SMA on a temporary alternate route, e.g., a push server, in accordance with aspects of the present disclosure.

In further embodiments, such as shown in FIGS. 4 and 5, the processor 115 may execute one or more applications and/or program modules that provide a user with a push notification, advising the user of an event, wherein the push notification includes a one-time password to permit temporary access to secured data, related to the event, via a temporary alternate route. The secured data has been stored by a system management appliance (SMA) in a server. By virtue of using the temporary alternate route, it is not necessary for the user to provide credentials necessary to obtain the secured data directly from the SMA using normal communication routes. This allows the mobile device 320 to avoid normal firewalls around an SMA to obtain information without creating substantial security risks for the SMA. This also provides the ability to: (i) obtain details of the event without going through access and authorization steps, (ii) provide details on a specific event without requiring or allowing access to the full system management software, (iii) forward details to another user without giving them authorization to access the full system management software, and (iv) make detailed information temporary so that secure information is not persistent on another party server.

More specifically, in embodiments, the push notification including the notice and the one-time password is sent to the user device (mobile device) 320 via, e.g., a push server 314. In embodiments, the one-time password permits temporary access to secured data 322, which has been stored in the SMA program in the computing device 105. The secured data 322 is related to the event and, by allowing the user device to access the SMA via a temporary alternate route, it is not necessary for the user provide credentials necessary to obtain the secured data 322 using normal communication routes between the user device and the SMA.

In embodiments, the one-time password provided is temporary and can self-destruct if the user does not take action after a given (selectable) period of time or other predefined occurrence. This one-time password can be sent with the push notification in encrypted form. In addition, the one-time password may be protected with an additional set of credentials, different than the credentials which would be required to access the secured data directly from the SMA using normal communication routes rather than the temporary alternate route. Also, the one-time password is structured in such a way so as not to be predictable and not to allow for extrapolation for future uses. Further, in addition to the one-time password, the push notification may include graphicals, detailed log information, or other information related to the event in the push notification.

Alternatively, rather than being provided in the push notification, itself, the one-time password can be sent as an additional signal in conjunction with the push notification which facilitates the addition of graphicals, detailed log information or other information related to the event in the push notification. In an illustrative example, a server is managed by a system management software program such as Lenovo XClarity Administrator (LXCA). The management of the information can be done within the secure datacenter network environment, while the system administrator ("user") is without direct access to the datacenter network.

In operation, the one-time password can be encoded in a push notification which is sent to the user's device along with an event summary. The user can access the data associated with the one-time password directly from the push notification via a web browser (of the mobile device 320). In alternative embodiments, the push notification can trigger an application (either the primary mobile application for the systems management or an independent, purpose specific application) which decodes and accesses the hosted data associated with the one-time password. In this way, the user can obtain details on the event in full rich-web format without having to provide full credentials to access the primary system management software. Accordingly, by implementing the systems and methods described herein, the computing system 100 may be configured to operate as a target management server to host a System Management Appliance (SMA) (see FIG. 3) to provide a user with a push notification.

Also, with regard to providing a one-time password with a push notification, instead of providing encoded data to permit reconstruction of a graphical image, the computing device 105 can provide such push notifications regarding errors which occur within the managed network. For example, when an error occurs on a server, an alert is logged on the systems management software. The details related to the particular failure on the particular server are formatted (including appropriate graphicals, detailed logs, etc.) and stored as secured data 322 where they can be accessed using the one-time password, as described herein.

The periods of time during which the one-time password or encoded data information included in the push notification are valid may be variable depending on the severity, sensitivity, or source of the triggering event. Thus, simple information alerts may be kept for a longer period of time (befitting their less-urgent status), while critical alerts may be removed after a short while (since they represent a more significant security exposure if the address is hacked). It is also noted that the secured data 322 can be hosted temporarily, to expire within a preset period of time, if desired.

It is also noted that the push notification can include both encoded data, such as JSON data to permit reconstructing a graphical image in the user device, and a one-time password to permit the user device to access additional secured data from the SMA via a temporary alternate route, thereby combining the advantages discussed above for respective embodiments. In this regard, it is noted that plural push notifications can be provided by the SMA to the user device with the additional information, such as the encoded data and the one-time password, respectively. It is further noted that, although the above description pertains to a one-time password, it is within the scope of the present disclosure that the password could be used more than a single time, if authorized by the SMA.

Still referring to FIG. 1, in embodiments, processor 115 may receive input signals from one or more input devices 130 and/or drive output signals through one or more output devices 135. The input devices 130 may be, for example, a keyboard or touch sensitive user interface (UI). The output devices 135 can be, for example, any display device, printer, etc.

The storage device 120 may include removable/non-removable, volatile/non-volatile computer readable storage media, such as, but not limited to, non-transitory media such as magnetic and/or optical recording media and their corresponding drives. The drives and their associated computer readable storage media provide for storage of computer readable program instructions, data structures, program modules and other data for operation of computing device 105 in accordance with the different aspects described herein. In embodiments, storage device 120 may store operating system 145, application programs 150, and program data 155 that perform the processes described herein, in addition to the secure data 322.

The system memory 125 may include a computer readable storage medium, including for example, non-transitory media such as flash memory, permanent memory such as read-only memory ("ROM"), semi-permanent memory such as random access memory ("RAM"), any other suitable type of storage component, or any combination thereof. A computer readable storage medium, as used herein, is not to be construed as being a transitory signal per se. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

Figure 2:
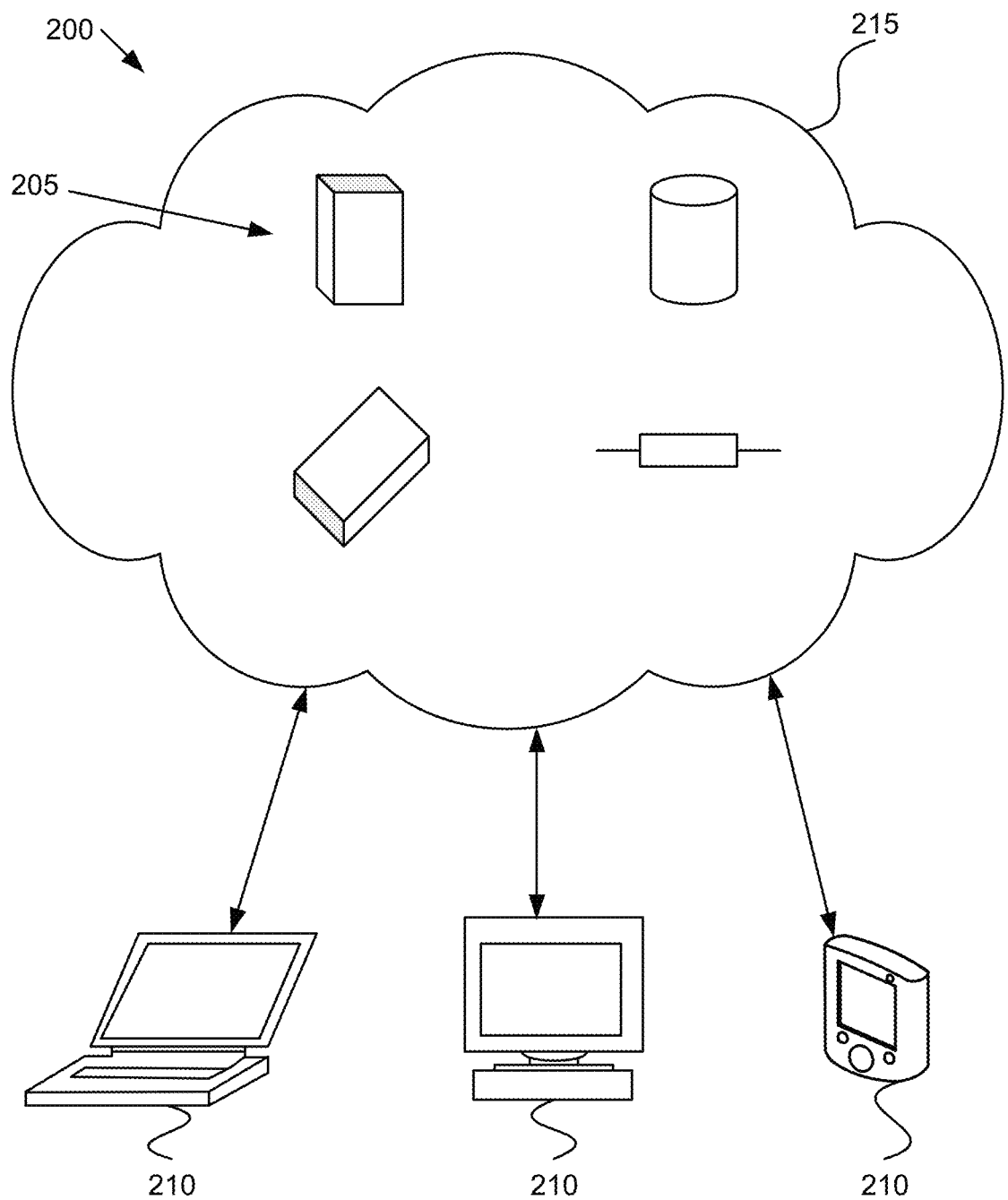
FIG. 2 shows an exemplary cloud computing environment in accordance with aspects of the present disclosure.

FIG. 2 shows an exemplary cloud computing environment 200 which can implement the processes and systems described herein. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200 including, e.g., push notifications and transfer and temporary storage of the secure data. Accordingly, it should be understood by those of ordinary skill in the art that the cloud resources 205 can include, e.g., push servers, secure servers and the SMA.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and plat forms. In embodiments, as described herein, cloud resources 205 may include a software defined environment including a network management server that provide a user device with a push notification with appropriate encoded data to permit the construction of a graphical image related to an event indicated in the push notification, or with a one-time password to permit the user device to obtain more detailed secured information regarding the event from the SMA via a temporary alternate route. In either case, the user device can obtain information related to the secured data without requiring the user to provide credentials necessary to obtain the secured data directly from the SMA using normal communication routes between the SMA and the user device.

Cloud resources 205 may be on a single network or a distributed network. Cloud resources 205 may be distributed across multiple cloud computing systems and/or individual network enabled computing devices.

Client devices 210 may comprise any suitable type of network-enabled computing device, such as servers, desktop computers, laptop computers, handheld computers (e.g., smartphones, tablet computers), set top boxes, and network-enabled hard drives.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

Figure 3:
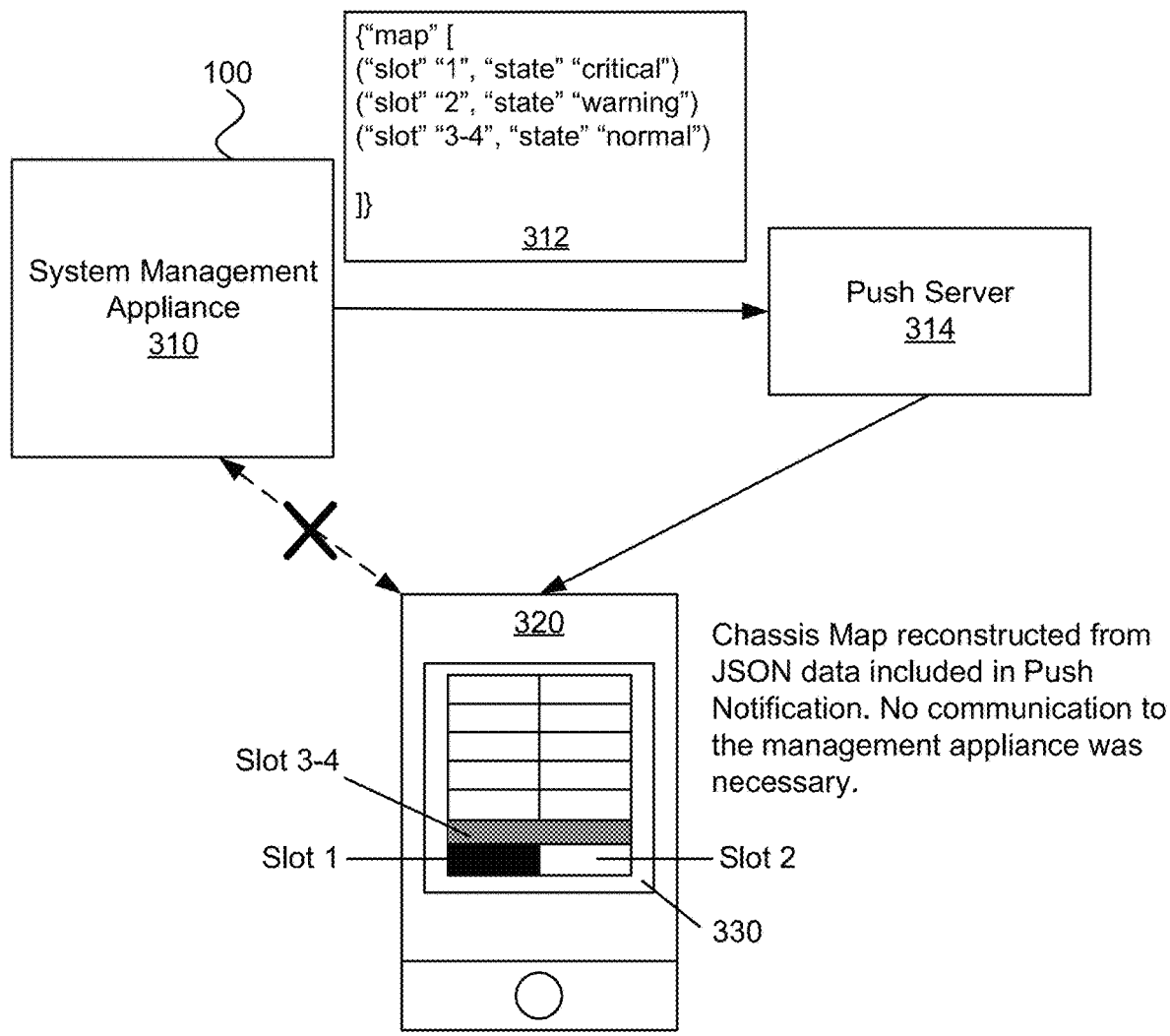
FIG. 3 shows a structure for permitting a user device to reconstruct a graphical image which indicates information pertaining to an alert provided in a push notification in accordance with aspects of the present disclosure.

FIG. 3 shows an illustrative structure and processes in which a system management appliance (SMA) 310 hosted in a target management server 100 provides a push notification 312 to a push server 314, amongst other features. As discussed above, the target management server 100 can be the computing system 100 such as shown in FIG. 1. In embodiments, the push server 314 receives the push notification 312 from the target management server 100, e.g., SMA 310, and then provides the push notification 312 to a user (e.g., mobile device 320).

As discussed above, the push notification which advises a user device of an event also includes encoded data, such as JavaScript Object Notification (JSON) data, Extensible Markup Language (. xml) data, Comma-separated values (CSV) data, simple tab-delimited text and a custom encoded data format, which permits a receiving application in a user device to decipher/reconstruct the encoded data in a graphical way. More particularly, the encoded data permits the construction of a graphical image which is related to the event which the push notification advises the user device of.

For example, as shown in FIG. 3, the graphical image can be a simple chassis map 330 of a server structure. The chassis map 330 is constructed in the mobile user device 320 based on the JSON data provided with the push notification. As shown in FIG. 3, the JSON data indicates appropriate information for respective slots of the chassis map 330 in the user device 320. For example, slot 1 on the lower left of the chassis map 330 can be colored with an appropriate color, such as red, to indicate a critical state for the server being identified in the push notification 312. Slot 2 on the lower right side of the chassis map 330 can be colored with an appropriate color, such as yellow, to indicate a warning state. Slots 3 and 4 can be colored with an appropriate color, such as green, to indicate that they are in a normal condition. In this way, the chassis map 330 shown on the user mobile device 320 can provide a simple graphical representation, based on the JSON data, regarding the status of slots of a server being identified in the push notification 312 so that the user will immediately be aware of which slots of the server are in need of attention. It is noted that although colors have been described regarding providing notifications of the status of different slots of the server, this is merely an illustrative example, and other forms of notification could be provided, such as numerical indicators, alphabetical indicators, star indicators, etc. Also, although a chassis map of a server has been used as an example, the encoded data could permit reconstruction of any type of hardware configuration or hardware component configuration, including, for example, a server, a switch, a storage component, a power supply, a cooling device, such as a fan, a motherboard, etc. As an example, a motherboard could be provided with visual indicators (overlaid on a graphic of the motherboard) to show where a memory DIMM has an error.

It is possible to encrypt the data in the push notification beyond HTTPS. For example, the XClarity Administrator, which is an SMA, already requires the mobile device to have Certificate Authority from a unique XClarity Administrator instance. This certificate could further be used to secure potentially sensitive data.

Also, given the size allotment for push notifications (e.g., 2 KB), it is possible to send multiple unique data constructs in a single message that could represent different graphicals. For example, a single message could include the necessary data for multiple different chassis maps or a chassis map and a completely separate object. Further, it is possible to group other message data (e.g., multiple notifications) into the data construct. For example, this provides the ability to visually show an error as well as to provide additional contextual error details within the visualized construct. Thus, a message could be included in the encrypting data provided with the push notification to advise the user verbally of the nature of the problem which is visually identified in the graphical reconstruction.

It is also possible to provide a dynamic construct. For example, in an effort to be as efficient as possible, the system could recognize the size limits of a push notification and include additional details (e.g., support contact for critical systems, MTM, VPD etc.) with the push notification or, alternatively, remove unnecessary information (e.g., not sending data on normal systems) as necessary to maximize efficiency and to prevent multiple messages.

Prioritization schemes can also be provided in accordance with aspects of the present disclosure. For example, if multiple systems enter a critical state (e.g., red state, as noted above), a graphical construct of those systems could be prioritized, with warning systems (e.g., yellow state, as noted above) sent later if the size limit of the push notification has been reached. In other words, it is possible to send multiple push notifications with encoded data if the encoded data necessary to provide a graphical reconstruction and/or provide additional information regarding the graphical reconstruction exceeds the size limit (e.g., 2 KB) permitted in a single push notification.

As shown in FIG. 4, a structure is provided to permit access to secure data in an SMA 310 in a target management server 100 on an alternate route 426 (other than a normal route between the SMA 310 and a user device 320). In this arrangement, a push notification 412 includes notification of an event and a one-time password/credentials which will permit a user device, such as the mobile device 320, to have temporary access to the SMA 310 via the temporary alternate route 426. The push notification 412, including the one-time password/credentials, is provided to the user device 320 through a push server 314. The temporary alternate route 426 permits access to a normally blocked port of the target management server 100 which hosts the SMA 310. Alternatively, the temporary alternate route 426 can permit access through a hole in a firewall to give temporary access to the SMA 310.

Regarding any of the embodiments, the credentials for the one time password are preferably in the form of encrypted data in a cryptographical key used to derive a set of single-use credentials. The credentials which are derived can have a strict time limit as well as the one-time use limitation. Thus, if the credentials related to the one-time password are not used within a preset period of time, they will become invalid. It is to be noted that the credentials regarding the one-time password can trigger software which will limit the capabilities of the user device 320 when connected via the alternate route 426, for example, when the user device 320 is logged into the target management server 100 via the one-time use password, the user device 320 may be allowed to view event details, but may be prohibited from taking potentially-dangerous actions, such as power actions. In other words, the user device 320 may be prevented from turning off devices associated with the server, or other device, which the push notification pertains to.

In any of the embodiments, it is possible to provide simultaneous creation of an associated account in the SMA 310. In other words, when a management software instance sends a push notification to a mobile device, it can also create an account associated with the credentials set that would be created by the user mobile device 320 in response to information provided in the push notification 312. This associated account could be a "throwaway account," which would allow access to the account for a short period of time when it is open, followed by deletion of the account (or requiring a different password for the next access to the account). This temporary account can be subject to the limitations noted above with regard to encryption and time limits for use of the account.

In embodiments, the information included in the push notification, including the one-time password, may make use of any known cryptographical method. Particular methods for such encryption can be chosen based on desired levels of security. For example, two-factor authentication can be used. In this arrangement, information sent in the clear as part of the push notification is combined with information unique to an instance of the application or device (such as a serial number or previously defined private key, or a user-entered passcode, fingerprint or facial recognition) to ensure that the notification can only be acted upon by an intended recipient. Alternatively, One-Time Pad OTP) can be utilized for encryption. In this case, the application instance and the target instance have previously exchanged cryptographical keys, for example, during initial set up or when connected via a secure path. In this case, the push notification 412 includes a flag that indicates that the next available OTP key is to be used to generate the set of credentials from the encrypted data.

Time-based authentication can also be used for cryptographical purposes. For example, various crypto graphical schemes incorporating keys that change with time or are generated/seeded according to real-time or elapsed time from a given instance can be utilized. Another alternative is to use simple cipher text, wherein an application may use an instance-unique cipher to decode a credential set. On the other hand, in appropriate instances, a credential set may be sent without any encryption (e.g., "in-the-clear"), relying instead on the temporary nature of the one-time password and/or the limited capabilities of the log-on for security.

Among other advantages, the arrangement/con figuration shown in FIG. 4 provides the ability for a user device 322 to connect back via the temporary alternate route 426 to the SMA 310 for additional details if a preferred normal connection path is not available. In effect, the arrangement/configuration shown in FIG. 4 provides an ad hoc secure server or ad hoc VPN connection which permits a mobile user device 322 to gather important information regarding an event indicated in a push notification 412 in a secure manner without the need for the credentials normally required for accessing the SMA 310.

As shown in FIG. 5, the temporary alternate route 426 between the user mobile device 320 and the SMA 310 can be provided through the push server 314, rather than via an independent path (such as shown in FIG. 4). This provides the advantage that the push server 314 already has, by definition, a valid connection from the user device to the target management server 100 (and the SMA 310), which initiated the push notification 412 in the first place. Otherwise, the arrangement/configuration shown in FIG. 5 operates in the same manner discussed above with regard to FIG. 4 by providing a push notification 412 which includes a one-time password with credentials to permit temporary access 422 by the user mobile device 320 to a normally blocked port or a hole in a firewall in the target management server 100 so that the user mobile device 320 can obtain additional secured data 322 from the target management server 100 pertaining to an event indicated in the push notification 412. It is noted that the "credentials" in this case are assumed to be a user ID/password pair. However, other credentialing schemes are possible, including the use of existing user IDs and only a temporary password, or any other combination of new and known credentials.

Figure 6:
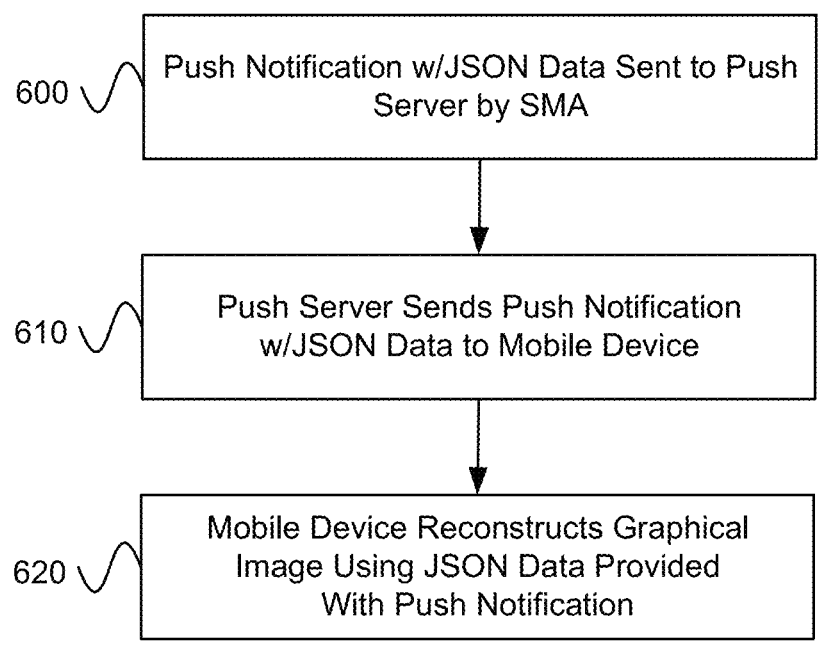
FIG. 6 shows a flowchart of steps for reconstructing a graphical image which indicates information pertaining to an alert provided in a push notification in accordance with aspects of the present disclosure.

FIG. 6 shows a flowchart of steps which can be implemented, for example, using the computing system 100 shown in FIG. 1, for permitting a user device to use secured data in a SMA to reconstruct a graphical image which indicates information pertaining to an alert provided in a push notification in accordance with aspects of the present disclosure. This process does not require the user to provide credentials normally required to access the secured data directly from the SMA. It also permits the user device to reconstruct a graphical image, such as a chassis map, from encoded data provided with the push notification when normal communication routes from the user device to a target management server hosting the SMA are not available.

In step 600, the SMA sends a push notification with a notification of an event and encoded data, such as JSON data, to a push server. The notification and the encoded data are related to secured data stored in the SMA. In step 610, the push server sends the push notification with the encoded data to the mobile device. In step 620, the mobile device reconstructs a graphical image, such as a chassis map of a server, using the encoded data provided with the push notification. As discussed herein, in addition to permitting reconstruction of a graphical image, the encoded data provided with the push notification can also include additional information pertaining to the event noted in the notification and the graphical image which is constructed based on the encoded data. As also discussed herein, a significant advantage of this arrangement is that it permits a very quick visual image for the user to review regarding the event identified by the push notification, without the need for the user to contact the SMA following receipt of the push notification.

Figure 7:
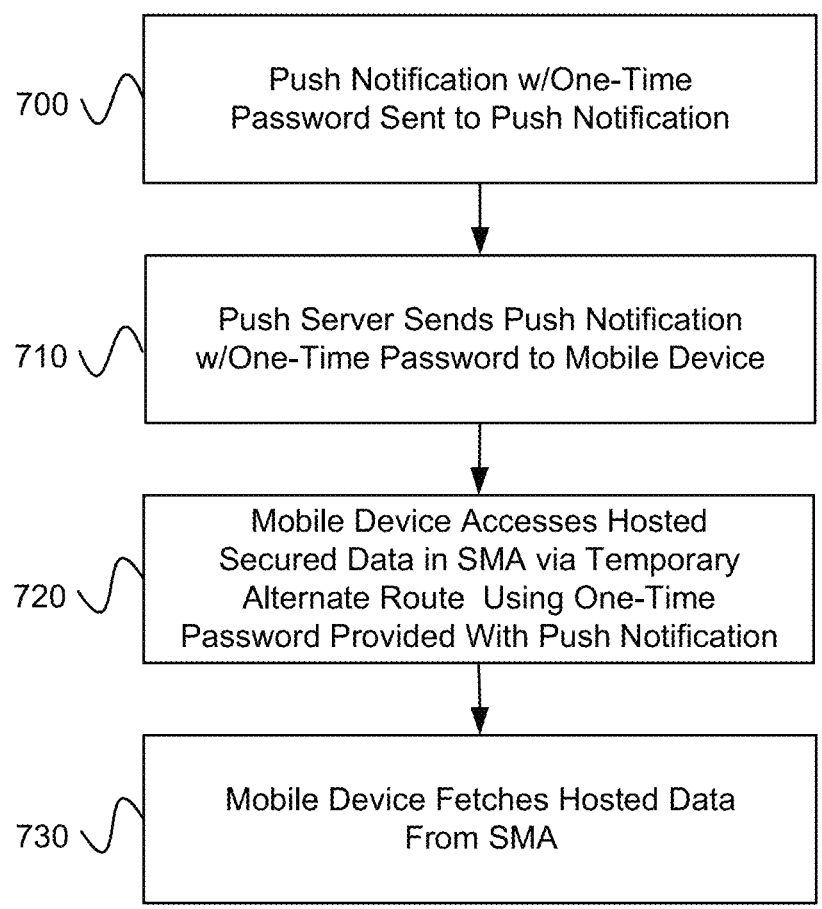
FIG. 7 shows a flowchart of steps for providing access to secured data in an SMA on a temporary alternate route to a normal route between the SMA and a user device in accordance with aspects of the present disclosure.

FIG. 7 shows a flowchart which can be implemented, for example, using the computing system 100 shown in FIG. 1, for providing access to secured data in an SMA on a temporary alternate route to a normal route between the SMA and a user device in accordance with aspects of the present disclosure. Again, in this process, there is no requirement that the user to provide credentials normally necessary to access the secured data directly from the SMA using normal communication routes between the user device and the SMA.

In step 700, the SMA pushes a push notification with a one-time password to a push server. In step 710, the push server sends the push notification with the one-time password to the user device. In step 720, the user device accesses the hosted secured data in the SMA via a temporary alternate route via a normally blocked port or through a hole in a firewall protecting the SMA using the one-time password provided with the push notification. In step 730, the user device fetches the hosted data from the SMA to store as fetched hosted data in the user device. As discussed herein, this operation permits obtaining secured data from an SMA without the need for extensive steps and credentialing associated with a user device accessing the SMA via normal communication routes such as a VPN. It also permits obtaining such secured data when such normal communication routes are not available.

Figure 8:
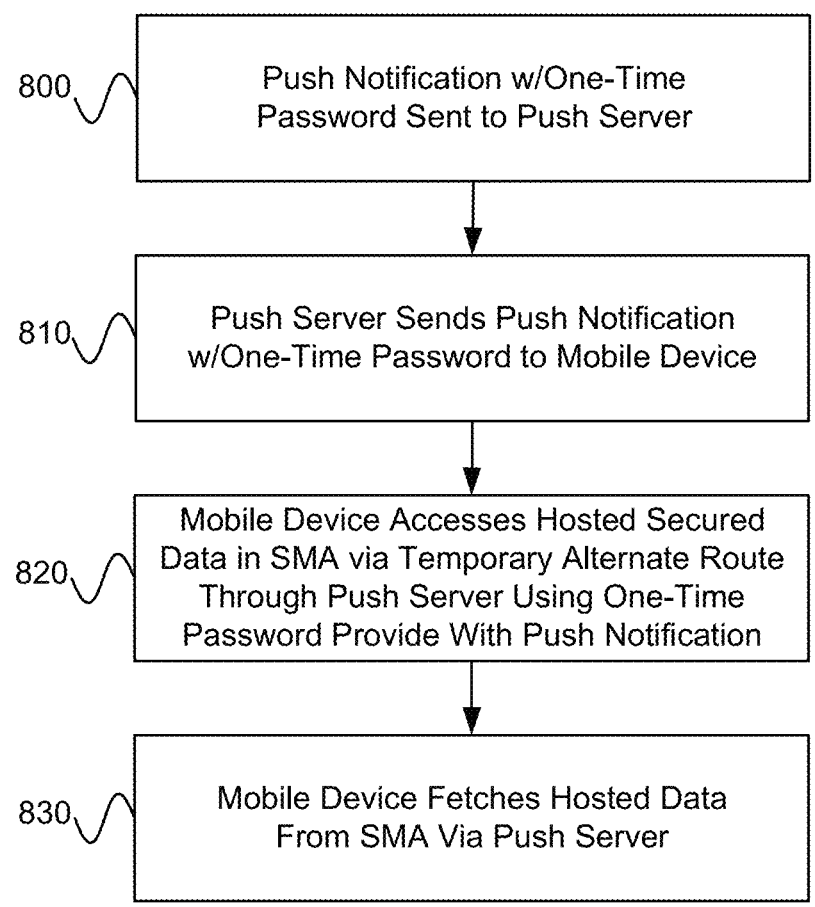
FIG. 8 shows a flowchart of steps for providing access to a user device to secured data in an SMA on a temporary alternate route which includes a push server in accordance with aspects of the present disclosure.

FIG. 8 shows a flowchart which can be implemented, for example, using the computing system 100 shown in FIG. 1, for providing access to secured data in an SMA on a temporary alternate route to a normal route between the SMA and a user device in accordance with aspects of the present disclosure, wherein the temporary alternate route passes through a push server. Again, in this process, there is no requirement that the user provide credentials normally necessary to access the secured data directly from the SMA using normal communication routes between the user device and the SMA.

In step 800, the SMA pushes a push notification with a one-time password to a push server. In step 810, the push server sends the push notification with the one-time password to the user device. In step 820, the user device accesses the hosted secured data in the SMA using the one-time password provided with the push notification. In this instance, the user device is permitted to access the SMA via a temporary alternate route which passes through the push server which provided the push notification in the first place. Again, the temporary alternate route is connected to a normally blocked port or a hole in the firewall of the SMA to permit temporary access to the secured data related to the push notification. In step 830, the user device fetches the hosted data from the SMA, via a temporary alternate route through the push server, to store as fetched hosted data in the user device. As discussed herein, this operation permits obtaining secured data from an SMA without the need for extensive steps and credentialing associated with a user device accessing the SMA via normal communication routes such as a VPN. It also permits obtaining such secured data when such normal communication routes are not available. In addition, this arrangement takes advantage of the already established connection between the push server and the SMA.

In embodiments, the access information included in the push notification may also include mechanisms to take corrective action, where this action is more limited in scope, impact, and authorized duration than would be allowed with a full log-in to the system management program. This includes, for example, allowing a user to take minor corrective actions for the individual user which will not adversely affect either the SMA or other users of the SMA.

The available actions described above may also be time-limited, and those time limits may be independent of the information aspects. Put another way, the user may still be able to see the details stored as the hosted secured data in the SMA after the opportunity to directly take action has expired. It is also possible to impose additional restrictions on access by the mobile device to the hosted secured data in the SMA. For example, access to this hosted secured data can be limited to mobile devices in certain geographical areas, or to certain days and times.

Although the above discussion focuses on a system management scenario, the same mechanisms described herein could be used in a wide variety of other scenarios where, as an alternative to full access to a high-security environment, a limited set of information can be sent to a less-secure environment for a limited time with the access information transmitted to the user as described. For example, in research programs or defense systems where a large number of users are granted varying degrees of access to centralized information based upon the level of their security clearance, users with lower levels of security clearance can temporarily be granted access to information which is necessary for them to conduct their research or take emergency action, even though these users would not normally be granted such access to this type of information.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing a push notification from a system management appliance (SMA) to a user device, the push notification including a one-time password for access to the SMA on a temporary alternate route to a normal route between the SMA and the user device to permit the user device to obtain additional information pertaining to the push notification,
wherein the one-time password provides limited access to the SMA different than normal access to the SMA via a different password and/or account.

2. The method of claim 1, wherein the normal route includes a virtual private network (VPN).

3. The method of claim 2, wherein the push notification is provided to the user device via a push server, and the temporary alternate route includes the push server.

4. The method of claim 1, wherein the temporary alternate route includes a temporarily unblocked port of the SMA.

5. The method of claim 1, wherein the SMA creates an account associated with the user device at the time the push notification is provided to the user device.

6. The method of claim 5, wherein the account allows a single access by the user device to access to the additional information.

7. The method of claim 1, wherein the one-time password provides temporary access to secured data comprising the additional information pertaining to the push notification.

8. The method of claim 1, wherein an area of the SMA accessible through the temporary alternate route is separated from other locations of the SMA by a firewall.

9. The method of claim 1, wherein the one-time password expires a pre-determined amount of time after the push notification is sent.

10. The method of claim 1, further comprising, concurrent with providing the push notification, sending the additional information to a location on the SMA, the location accessible to the user device via the temporary alternate route.

11. An apparatus comprising:
a processor; and
a memory that stores code executable by the processor to:
provide a push notification from a system management appliance (SMA) to a user device, the push notification including a one-time password for access to the SMA on a temporary alternate route to a normal route between the SMA and the user device to permit the user device to obtain additional information pertaining to the push notification,
wherein the one-time password provides limited access to the SMA different than normal access to the SMA via a different password and/or account.

12. The apparatus of claim 11, wherein the normal route includes a virtual private network (VPN).

13. The apparatus of claim 12, wherein the push notification is provided to the user device via a push server, and the temporary alternate route includes the push server.

14. The apparatus of claim 11, wherein the temporary alternate route includes a temporarily unblocked port of the SMA.

15. The apparatus of claim 11, wherein the SMA creates an account associated with the user device at the time the push notification is provided to the user device, wherein the account allows a single access by the user device to access to the additional information.

16. The apparatus of claim 11, wherein the one-time password provides temporary access to secured data comprising the additional information pertaining to the push notification.

17. The apparatus of claim 11, wherein an area of the SMA accessible through the temporary alternate route is separated from other locations of the SMA by a firewall.

18. The apparatus of claim 11, wherein the one-time password expires a pre-determined amount of time after the push notification is sent.

19. A program product comprising a computer readable storage medium having computer readable program instructions thereon, the computer readable program instructions being configured to be executable by a processor to perform operations comprising:
providing a push notification from a system management appliance (SMA) to a user device, the push notification including a one-time password for access to the SMA on a temporary alternate route to a normal route between the SMA and the user device to permit the user device to obtain additional information pertaining to the push notification,
wherein the one-time password provides limited access to the SMA different than normal access to the SMA via a different password and/or account.

* * * * *